United States Patent
Kondratowicz et al.

(10) Patent No.: US 10,808,093 B2
(45) Date of Patent: Oct. 20, 2020

(54) COMBINATION OF SILICA AND GRAPHITE AND ITS USE FOR DECREASING THE THERMAL CONDUCTIVITY OF VINYL AROMATIC POLYMER FOAM

(71) Applicant: SYNTHOS S.A., Oswiecim (PL)

(72) Inventors: Filip Lukasz Kondratowicz, Cracow (PL); Piotr Rojek, Cracow (PL); Marzena Mikoszek-Operchalska, Ruda Slaska (PL); Kamil Utrata, Cwiklice (PL)

(73) Assignee: SYNTHOS S.A., Oswiecim (PL)

( * ) Notice: Subject to any disclaimer, the term of this patent is extended or adjusted under 35 U.S.C. 154(b) by 0 days.

(21) Appl. No.: 15/543,336

(22) PCT Filed: Jan. 14, 2016

(86) PCT No.: PCT/EP2016/050627
§ 371 (c)(1),
(2) Date: Jul. 13, 2017

(87) PCT Pub. No.: WO2016/113332
PCT Pub. Date: Jul. 21, 2016

(65) Prior Publication Data
US 2018/0030231 A1    Feb. 1, 2018

(30) Foreign Application Priority Data
Jan. 14, 2015  (EP) ..................... 15461506

(51) Int. Cl.
| | | |
|---|---|---|
| *B32B 5/24* | (2006.01) |
| *B32B 5/06* | (2006.01) |
| *B32B 5/22* | (2006.01) |
| *B32B 7/08* | (2019.01) |
| *B32B 27/30* | (2006.01) |
| *B32B 5/18* | (2006.01) |
| *C08K 7/14* | (2006.01) |
| *C08K 9/02* | (2006.01) |
| *C08J 9/00* | (2006.01) |
| *B29C 48/285* | (2019.01) |
| *C08J 9/14* | (2006.01) |
| *C08J 9/16* | (2006.01) |
| *C08K 3/04* | (2006.01) |
| *B29B 9/06* | (2006.01) |
| *B29C 44/34* | (2006.01) |
| *C08J 9/20* | (2006.01) |
| *C08J 9/228* | (2006.01) |
| *C08K 3/36* | (2006.01) |
| *C08K 5/5419* | (2006.01) |
| *C08K 5/544* | (2006.01) |
| *C08K 7/18* | (2006.01) |
| *F16L 59/02* | (2006.01) |
| *B29K 105/00* | (2006.01) |
| *B29K 507/04* | (2006.01) |
| *B29K 509/02* | (2006.01) |
| *B29L 31/00* | (2006.01) |

(52) U.S. Cl.
CPC ............. *C08J 9/0066* (2013.01); *B29B 9/065* (2013.01); *B29C 44/3461* (2013.01); *B29C 48/285* (2019.02); *C08J 9/141* (2013.01); *C08J 9/16* (2013.01); *C08J 9/20* (2013.01); *C08J 9/228* (2013.01); *C08K 3/042* (2017.05); *C08K 3/36* (2013.01); *C08K 5/544* (2013.01); *C08K 5/5419* (2013.01); *C08K 7/18* (2013.01); *F16L 59/028* (2013.01); *B29K 2105/0026* (2013.01); *B29K 2507/04* (2013.01); *B29K 2509/02* (2013.01); *B29K 2995/0015* (2013.01); *B29L 2031/7734* (2013.01); *C08J 2201/03* (2013.01); *C08J 2203/12* (2013.01); *C08J 2203/14* (2013.01); *C08J 2203/182* (2013.01); *C08J 2207/00* (2013.01); *C08J 2325/06* (2013.01); *C08J 2325/08* (2013.01); *C08K 2201/001* (2013.01); *C08K 2201/005* (2013.01); *C08K 2201/006* (2013.01)

(58) Field of Classification Search
None
See application file for complete search history.

(56) References Cited

U.S. PATENT DOCUMENTS

| | | |
|---|---|---|
| 3,393,260 A | 7/1968 | Miler |
| 6,340,713 B1 | 1/2002 | Glück et al. |
| 7,135,263 B2 | 11/2006 | Kawakami et al. |
| 2005/0075442 A1* | 4/2005 | Titelman ................ C08K 3/04 524/495 |
| 2007/0112082 A1 | 5/2007 | Hahn et al. |

(Continued)

FOREIGN PATENT DOCUMENTS

| | | |
|---|---|---|
| CN | 101068863 | 11/2007 |
| CN | 102307937 | 1/2012 |

(Continued)

OTHER PUBLICATIONS

Yuan et al., "Suspension Polymerization" *Journal of Macromolecular Science, Part C: Polymer Reviews*, C31: 2 & 3, 215-299 (1991).

(Continued)

*Primary Examiner* — Alexandre F Ferre
(74) *Attorney, Agent, or Firm* — Nixon & Vanderhye P.C.

(57) ABSTRACT

The invention relates to the co-use of a) a certain type of silica and b) a certain type of graphite, wherein the silica and the graphite are used in a weight ratio in a range of from 1:1 to 1:10, for decreasing the thermal conductivity of vinyl aromatic polymer foam.

6 Claims, No Drawings

(56) References Cited

U.S. PATENT DOCUMENTS

| | | | |
|---|---|---|---|
| 2008/0028994 | A1 | 2/2008 | Barlet-Gouedard et al. |
| 2008/0203597 | A1 | 8/2008 | Rogov et al. |
| 2008/0249199 | A1 | 10/2008 | Nising |
| 2009/0013907 | A1 | 1/2009 | Boxley et al. |
| 2010/0148110 | A1* | 6/2010 | Casalini ............... C08J 9/0066 252/62 |
| 2011/0213045 | A1 | 9/2011 | Handl |
| 2011/0224316 | A1 | 9/2011 | Ferstl et al. |
| 2011/0284793 | A1 | 11/2011 | Ponticiello et al. |
| 2012/0032103 | A1* | 2/2012 | Ulanova ............. B29C 44/3461 252/62 |
| 2012/0091388 | A1 | 4/2012 | Felisari et al. |
| 2012/0216716 | A1 | 8/2012 | Boxley et al. |
| 2012/0264836 | A1 | 10/2012 | Felisari et al. |
| 2012/0322905 | A1* | 12/2012 | Kusanose ............. C08J 9/0042 521/139 |
| 2014/0001394 | A1 | 1/2014 | Nowe et al. |
| 2014/0005302 | A1 | 1/2014 | Briand et al. |
| 2014/0184249 | A1 | 7/2014 | Saafi et al. |
| 2015/0114641 | A1 | 4/2015 | Bestaoui-Spurr et al. |

FOREIGN PATENT DOCUMENTS

| | | |
|---|---|---|
| CN | 102666686 | 9/2012 |
| DE | 198 28 250 | 12/1999 |
| DE | 10341298 | 3/2005 |
| DE | 10 2004 034 516 | 2/2006 |
| DE | 10 2004 058 583 | 6/2006 |
| DE | 10 2013 001 927 | 8/2014 |
| EP | 0 620 246 | 10/1994 |
| EP | 0 632 522 | 1/1995 |
| EP | 0 856 353 | 8/1998 |
| EP | 0 863 175 | 9/1998 |
| EP | 1 031 600 | 8/2000 |
| EP | 0 981 574 | 9/2000 |
| EP | 1 159 338 | 12/2001 |
| EP | 1 661 940 | 5/2006 |
| EP | 1 693 413 | 8/2006 |
| EP | 1 771 502 | 4/2007 |
| EP | 1 892 034 | 2/2008 |
| EP | 2 025 961 | 2/2009 |
| EP | 1 758 951 | 5/2010 |
| EP | 3 245 247 | 12/2018 |
| EP | 3 245 172 | 1/2019 |
| FR | 2 964 113 | 3/2012 |
| JP | 63-183941 | 7/1988 |
| JP | 7-022834 | 1/1995 |
| JP | 8-311232 | 11/1996 |
| JP | 2001-151900 | 6/2001 |
| JP | 2001-250423 | 9/2001 |
| JP | 2001-279014 | 10/2001 |
| JP | 2002-121310 | 4/2002 |
| JP | 2007-514027 | 5/2007 |
| JP | 2009-144134 | 7/2009 |
| JP | 2010-527391 | 8/2010 |
| JP | 2012-136712 | 7/2012 |
| JP | 2012-526170 | 10/2012 |
| JP | 2013-507477 | 3/2013 |
| JP | 2013-159632 | 8/2013 |
| JP | 2014-80514 | 5/2014 |
| JP | 2014-148661 | 8/2014 |
| KR | 10-1431002 | 9/2014 |
| KR | 101431002 | 9/2014 |
| WO | WO 97/45477 | 12/1997 |
| WO | WO 98/31644 | 7/1998 |
| WO | WO 98/51734 | 11/1998 |
| WO | WO 00/43442 | 7/2000 |
| WO | WO 02/055594 | 7/2002 |
| WO | WO 2004/087798 | 10/2004 |
| WO | WO 2005/123816 | 12/2005 |
| WO | WO 2006/007995 | 1/2006 |
| WO | WO 2006/058733 | 6/2006 |
| WO | WO 2006/061571 | 6/2006 |
| WO | WO 2008/061678 | 5/2008 |
| WO | WO 2008/141766 | 11/2008 |
| WO | WO 2009/009089 | 1/2009 |
| WO | WO 2010/128369 | 11/2010 |
| WO | WO 2010/141976 | 12/2010 |
| WO | WO 2010/149624 | 12/2010 |
| WO | WO 2011/042800 | 4/2011 |
| WO | WO 2011/092250 | 8/2011 |
| WO | WO 2012/024708 | 3/2012 |
| WO | WO 2012/024709 | 3/2012 |
| WO | WO 2012/032022 | 3/2012 |
| WO | WO 2012/052423 | 4/2012 |
| WO | WO 2012/146577 | 11/2012 |
| WO | WO 2015/065710 | 5/2015 |
| WO | WO 2016/113321 | 7/2016 |

OTHER PUBLICATIONS

International Preliminary Report on Patentability for PCT/EP2016/050594, dated Apr. 21, 2017.
International Preliminary Report on Patentability for PCT/EP2016/050616, dated Jul. 18, 2017.
International Preliminary Report on Patentability for PCT/EP2016/050637, dated Jun. 2, 2017.
International Search Report for PCT/EP2016/050594, dated Apr. 6, 2016.
International Search Report for PCT/EP2016/050616, dated Mar. 30, 2016.
International Search Report for PCT/EP2016/050637, dated Apr. 7, 2016.
Naoki, "Dielectric cellular moldings with improved dimensional stability for spherical Luneburg lenses", Chemical Abstracts Service, XP002741017, Oct. 10, 2001 (refers to JP 2001-279014).
Shigehiko et al., "Manufacture of foamable resin particles containing ceramics", Chemical Abstracts Service, XP002741016, Feb. 17, 1997, 2 pages (refers to JP 8-311232).
U.S. Office Action issued in U.S. Appl. No. 15/543,319 dated Apr. 3, 2018.
Written Opinion of the ISA for PCT/EP2016/050594, dated Apr. 6, 2016.
Written Opinion of the ISA for PCT/EP2016/050637, dated Apr. 7, 2016.
International Search Report for PCT/EP2016/050627, dated Apr. 11, 2016, 2 pages.
International Preliminary Report on Patentability, dated Apr. 26, 2017, 7 pages.
Letter accompanying the Demand dated Nov. 14, 2016 from Synthos S.A. to EPO in PCT/EP2016/050627 with experimental report of Nov. 14, 2016 with Annexes 1 and 2.
Office Action issued in U.S. Appl. No. 15/543,307 dated Jun. 17, 2019.
Notice of Opposition issued in EP Appln. No. 16700595.8 dated Jun. 5, 2019.
Busico et al., "Physical Characterization of Layered Perovskites—Polystyrene Composites" *Journal of Applied Polymer Science*, vol. 25: 2857-2868 (1980).
Encyclopedia of Polymer Science and Technology, Concise Third Edition, p. 43 (2007).
Last, "Infrared-Absorption Studies on Barium Titanate and Related Materials" *Physical Review*, vol. 105, No. 6: 1740-1750 (Mar. 15, 1957).
Luxon et al., "Effect of Particle Size and Shape on the Infrared Absorption Spectra of Barium Titanate and Strontium Titanate Powders" *Journal of Applied Physics*, vol. 41, No. 6: 2303-2307 (May 1970).
Posch et al., "Infrared Properties of Solid Titanium Oxides: Exploring Potential Primary Dust Condensates" *The Astrophysical Journal Supplement Series*, vol. 149: 437-445 (Dec. 2003).
Random House Webster's Unabridged Dictionary, Second Edition, propagation to prophylaxis, 1 page (1998).
Roth, "Classification of Perovskite and Other $ABO_3$-Type Compounds" *Journal of Research of the National Bureau of Standards*, vol. 58, No. 2: 75-88 (Feb. 1957).

(56) References Cited

OTHER PUBLICATIONS

Sheng et al., Catalytically Synergistic Effects of Novel $LaMnO_3$ Composite Metal Oxide in Intumescent Flame-Retardant Polypropylene System *Polymer Composites*, pp. 2390-2400 (2014).

Tarun et al., "Infrared absorption of hydrogen-related defects in strontium titanate" *Journal of Applied Physics*, vol. 109: 063706-1-063706-4 (2011).

Win et al., "Synthesis of Barium Titanate from Titanyl Acylate Precursor by Sol-precipitate Method" *Jour. Myan. Acad. Arts & Sc.*, vol. VI, No. 1: 61-70 (2008).

Zhang et al., "Preparation and Characterization of Calcium Titanate ($CaTiO_3$) Whiskers via Molten Salt Method" *Advanced Materials Research*, vol. 630: 89-92 (2013).

Office Action issued in JP Appln. No. 2017-537278 dated Oct. 8, 2019 (w/ translation).

Office Action issued in JP Appln. No. 2017-537274 dated Oct. 15, 2019 (w/ translation).

Office Action issued in JP Appln. No. 2017-537284 dated Jun. 4, 2019 (w/ translation).

Search Report issued in EP Appln. No. 19150362.2 dated Mar. 18, 2019.

Office Action issued in JP Appln. No. 2017-537278 dated Oct. 8, 2019.

Office Action issued in JP Appln. No. 2017-537274 dated Oct. 15, 2019.

Opposition filed against EP Patent No. 3 245 247 (Appln. No. 16701911.6) dated Sep. 26, 2019.

Opposition filed against EP Patent No. 3 245 172 (Appln. No. 16700584.2) dated Oct. 9, 2019.

Submission by Applicant in EP Appln. No. 16701911.6 dated Apr. 3, 2018.

Submission by Applicant (accompanying Demand) in PCT/EP2016/050594 dated Nov. 14, 2016.

De Weerdt, "Geopolymers—State of the art" *COIN Project Report* 37 (2011).

Duxson et al., "Geopolymer technology: the current state of the art" *Journal of Materials Science* vol. 42, No. 9: 2917-2933 (2007).

IUPAC. Compendium of Chemical Terminology, 2nd ed. (the "Gold Book"). Compiled by A. D. McNaught and A. Wilkinson. Blackwell Scientific Publications, Oxford (1997). Online version (2019-) created by S. J. Chalk. ISBN 0-9678550-9-8. https://doi.org/10.1351/goldbook.

Škvára, "Alkali Activated Materials or Geopolymers?" *Ceramics Silikaty*, vol. 51, No. 3: 173-177 (2007).

Technical Bulletin Fine Particles by Degussa AG, No. 11, pp. 1-71 (2006).

Office Action issued in CN Appln. No. 201680015877.5 dated Dec. 2, 2019 (w/ translation).

Office Action issued in IN Appln. No. 201717024832 dated Dec. 19, 2019.

Office Action issued in CN Appln. No. 201680015357.4 dated Jan. 2, 2020 (w/ translation).

Office Action issued in IN Appln. No. 201717024821, dated Jan. 9, 2020 (with translation).

Office Action issued in BR Appln. No. 112017014925-7 dated Jan. 27, 2020 (w/ partial translation).

Office Action issued in BR Appln. No. 112017014972-9 dated Jan. 21, 2020 (w/ partial translation).

\* cited by examiner

COMBINATION OF SILICA AND GRAPHITE AND ITS USE FOR DECREASING THE THERMAL CONDUCTIVITY OF VINYL AROMATIC POLYMER FOAM

This application is the U.S. national phase of International Application No. PCT/EP2016/050627 filed 14 Jan. 2016, which designated the U.S. and claims priority to EP Patent Application No. 15461506.6 filed 14 Jan. 2015, the entire contents of each of which are hereby incorporated by reference.

The present invention relates to the use of a) a certain type of silica in combination with b) a certain type of graphite, for decreasing the thermal conductivity of vinyl aromatic polymer foam. The invention also relates to processes for the preparation of expandable polymer granulates and the expandable polymer granulate. The invention further relates to vinyl aromatic polymer foam and to a masterbatch comprising the mixture of a) with b).

Vinyl aromatic polymers are known and are used for the preparation of expanded products that are adopted in a variety of applications, of which the most important one is for thermal insulation. This is why there is a continuously increasing demand for expanded vinyl aromatic polymers with low thermal conductivity as well as good mechanical and self-extinguishing properties.

It is generally known that the addition of athermanous additives from the group of heat absorbers (e.g. carbon black), heat scatterers (e.g. minerals from the group of silicas and titanium oxides) and heat reflectors (e.g. aluminium pigment and graphite) decreases the thermal conductivity of vinyl aromatic polymer foams. Examples for such types of polymers are those obtained by suspension polymerization of vinyl aromatic monomers (in particular of styrene) and optionally comonomers. Other examples for such type of polymers are those obtained by the extrusion of general purpose polystyrene or its copolymers.

Typically, the addition of a combination of athermanous additives that can absorb or scatter heat radiation to prolong the IR rays' pathway results in a significant decrease of thermal conductivity. However, the addition of IR reflectors results in the most advantageous effect. A combination of IR scatterers and IR reflectors can influence the reduction of the concentration of typical IR absorbers (such as carbon black) and leads to an improvement of the self-extinguishing effect of polystyrene foams. However, an addition of carbon black, especially in extrusion processes, requires the addition of a relatively high amount of brominated flame retardant, to maintain acceptable self-extinguishing properties, e.g. suitable performance for passing the flammability test according to the German industry standard DIN 4102 (B1, B2).

Poor thermal stability of foams made of vinyl aromatic polymers filled with carbon-based athermanous additives is also a problem. Such foams, having black or grey colour, absorb a relatively high amount of heat energy, thus the insulation boards made thereof and applied on building walls can shrink or deform significantly. Thus, the insulation performance may deteriorate. Finally, when trying to create an optimum cell structure with a narrow cell size distribution, in order to obtain materials with significantly decreased thermal conductivity, several problems were identified when using carbon black, graphite or especially mineral athermanous additives, because these additives also act as nucleating agents and have a negative effect on bubble formation.

On the other hand, the presence of small amounts of athermanous fillers of the heat scatterer type does not result in a substantial deterioration of the flame retarded polymer foam's self-extinguishing properties. Rather, these properties are improved, but the decrease of the foam's thermal conductivity is not as pronounced as it would be in foams comprising carbon-based additives, i.e. comprising athermanous additives of the heat absorber or of the heat reflector type (in particular carbon blacks and/or graphites).

WO 2006/058733 A1 teaches expandable styrene polymer granulates containing a) filler selected from the group of inorganic powder materials (such as silicic acid) and b) carbon black or graphite. The amount of a) filler is 5 to 50 wt. %, and the amount of b) carbon black or graphite is 0.1 to 10 wt. %. The filler of WO 2006/058733 A1 has an average particle diameter in a range of from 1 to 100 µm.

WO 2008/061678 A2 discloses the use of carbon black having a specific electric conductivity, and optionally graphite, to decrease the thermal conductivity of expandable vinyl aromatic polymers.

WO 2012/024708 A1 teaches polymer foams containing carbon-based athermanous particles. The carbon of the athermanous particles is partially arranged in a graphitic manner and is also present as turbostratic carbon.

EP 0 620 246 A1 teaches the use of athermanous materials in polystyrene hard foam (EPS or XPS). Examples for athermanous materials are metal oxides (such as $Fe_2O_3$ or $Al_2O_3$), non-metal oxides (such as $SiO_2$), metal powder, aluminium powder, carbon (such as carbon black, graphite or even diamond), or organic colorants or colorant pigments.

JP 63183941 teaches the use of aluminium pigment, titanium dioxide and graphite, having specific particle size and heat radiation reflectivity, to decrease the thermal conductivity of polystyrene foams. The silica powder used in Example 6 as listed in Table 1 of JP 63183941 has an average particle size of 3.2 µm.

EP 1 159 338 A teaches expandable polystyrene (EPS) containing aluminium particles and optionally graphite. Further, EP 0 863 175, EP 0 981 574, EP 1 758 951, DE 198 28 250 A1, WO 98/51734 A1, EP 1 031 600 A2, EP 1 661 940 A1, WO 02/055594 A1 and EP 1 771 502 A2 teach the use of graphite in polystyrene foams.

US 2012/0091388 A1 discloses expanded vinyl aromatic polymers comprising a. graphite, b. optional self-extinguishing brominated additive, c. optional synergist for b., and d. optional inorganic additive. An example for d. inorganic additive is silicon oxide (such as aerosilica). The BET surface of a typical aerosilica is well above 100 $m^2/g$, and the particle size is well below 10 nm. When using aerosilica for example in an extrusion process for the production of expandable vinyl aromatic polymer granulate, it is impossible to stabilize the process even in the presence of small amounts of aerosilica, e.g. below 1 wt. %: because of aerosilica's very high BET, the resultant modification of rheology is so strong that pressure increases dramatically, and it is not possible to stabilize the process and the granulate.

US 2007/112082 A1 discloses moldable-foam moldings whose density is in the range from 8 to 200 g/l, obtainable via fusion of pre-foamed foam beads composed of expandable pelletized filled thermoplastic polymer materials, and a process for preparing the expandable pelletized polymer materials.

EP 2 025 961 A2 teaches a two-step process for the production of expandable polystyrene granulate. The process includes the mixing of graphite particles with a styrene-based resin and extruding the composition, and carrying out seed polymerization by suspending the graphite-containing micropellets in water and adding styrene-based monomer.

WO 2012/024709 A1 teaches flame retarded expandable polymers containing solid carbon-based additives containing sulphur, wherein the sulphur content is at least 2000 ppm. Examples for the solid additive are anthracite, coke and carbon dust.

A desired expanded polymer foam should contain athermanous filler(s) of a type and in an amount that maintain the foam's self-extinguishing and mechanical properties in the same range as in an expanded polymer without such fillers, and that at the same time decrease the thermal conductivity of the foam.

It has now surprisingly been found in accordance with the present invention that the co-use of
- a) a certain type of silica, in a specific amount, and
- b) a certain type of graphite, in a specific amount,
- decreases the thermal conductivity of vinyl aromatic polymer foam (the decrease being measured in accordance with ISO 8301), without adversely affecting the foam's flammability and mechanical properties, and that this effect is particularly pronounced if a) the type of silica and b) the type of graphite are used in a weight ratio, i.e. a):b), in a range of from 1:1 to 1:10.

The present invention has the following aspects:
- (I) the use of a) silica in combination with b) graphite, for decreasing the thermal conductivity of vinyl aromatic polymer foam;
- (II) processes for the preparation of expandable polymer granulate;
- (III) expandable polymer granulate comprising one or more propellants, a) silica, b) graphite, and c) vinyl aromatic polymer;
- (IV) expanded vinyl aromatic polymer foam comprising a) silica, b) graphite, and c) vinyl aromatic polymer; and
- (V) a masterbatch comprising a) silica, b) graphite, and c) vinyl aromatic polymer.

DETAILED DESCRIPTION

In a first aspect, the invention relates to the use of a) a certain type of silica in combination with b) a certain type of graphite, for decreasing the thermal conductivity of vinyl aromatic polymer foam.

The polymer used in accordance with the invention is based on one (or more) vinyl aromatic monomer(s), preferably styrene, and optionally one or more comonomers, i.e. it is a homopolymer or a copolymer. The polymer composition comprises, in addition to the polymer component, a) silica and b) graphite, and typically and preferably a variety of further additives, as set out below.

Silica

The silica as used in accordance with the invention is amorphous and has the following specific properties:
- (i) a BET surface of from 1 to 100 m²/g and,
- (ii) an average particle size in a range of from 3 nm to 1,000 nm.

The method to determine the silica's BET surface is preferably based on the standards ASTM C1069 and ISO 9277 and is conducted as follows: in the first step, 2 to 5 g of sample are dried at 105° C. and placed in a desiccator for cooling and further degassing. Subsequently, 0.3 to 1.0 g of the dry material is weighed into a test tube and placed in the degassing unit for about 30 min. Afterwards, the sample is transferred to the measuring unit and is measured using the Micromeritics Tristar 3000 instrument.

The silica as used according to the invention preferably has a BET surface in a range of from 3 to 80 g/m², more preferably 5 to 70 m²/g, most preferably 8 to 60 m²/g, such as 10 to 50 m²/g, in particular 13 to 40 m²/g, or 15 to 30 m²/g, such as about 20 m²/g.

Moreover, the silica as used according to the present invention is defined by an average particle size, as measured according to the procedure detailed below, of 3 nm to 1000 nm.

Average particle size in the description of the present invention means median primary particle size, D(v, 0.5) or d(0.5), and is the size at which 50% of the sample is smaller and 50% is larger. This value is also known as the Mass Median Diameter (MMD) or the median of the volume distribution.

The method to determine the average particle size is conducted as follows: in the first step, 45 g of distilled water and 5 g of sample are placed into a beaker and stirred to allow the entire sample to be wetted. Subsequently, the sample is dispersed in an external ultrasonic probe for 5 min at 100% amplitude. The measurement is performed automatically using the primary agglomerate program in a Malvern MasterSizer 2000 device.

It is preferred that the average particle size of the silica as used according to the present invention is within a range of 20 to 800 nm, preferably 30 to 600 nm, such as 40 to 400 nm, in particular from 100 to 200 nm.

According to the present invention, the silica is present in an amount of from 0.01 to less than 2 wt. %, based on the weight of the polymer (inclusive of solid and, if any, liquid additives, but exclusive of propellant). Preferably, silica is present in an amount of 0.1 to 1.6 wt. %, more preferably 0.5 to 1.5 wt. %, such as about 1.0 wt. %, based on the weight of the vinyl aromatic polymer (inclusive of solid and, if any, liquid additives, but exclusive of propellant).

The silica according to the invention is amorphous (i.e. non-crystalline) silicon dioxide, and the silica particles are preferably spherically shaped.

It is most preferred that the silica a) as used according to the present invention comprises a Sidistar type of material from ELKEM, typically with an average primary particle size of about 150 nm and a low BET surface area of about 20 m²/g, and most preferred is that a) is Sidistar T120.

Graphite

The graphite as used in the invention has the following properties:
- (i) a carbon content in a range of from 50 to 99.99 wt. % and
- (ii) a particle size in a range of from 0.01 to 100 μm.

Preferably, the graphite's carbon content is in a range of from 95 to 99.9 wt. % and more preferably over 99.5 wt. %. Preferably, the carbon content is measured according to the method L-03-00A of the company GK.

The graphite as used according to the invention has a particle size in a range of from 0.01 to 100 μm, preferably as measured according to method L-03-00 of the company GK, which is a laser diffraction method using a Cilas 930 particle size analyzer equipment. It is preferred that the particle size of the graphite as used according to the invention is from 0.1 to 30 μm. The most preferred particle size range is from 0.5 to 25 μm, in particular from 1 to 10 μm; specifically, for example, a range of from 3 to 8 μm.

The graphite's mean particle size is preferably in a range of from 5 to 7 μm, D90 in a range of from 7 to 15 μm, and D100 in a range of from 15 to 20 μm.

The sulphur content of the graphite as used according to the invention is preferably in a range of from 10 to 2000 ppm, as measured according to ASTM D1619, preferably from 100 to 1500 ppm, in particular from 400 to 1000 ppm.

The ash content of the graphite as used according to the invention is preferably in a range of from 0.01 to 2 wt. %, preferably from 0.1 to 1 wt. %, in particular below 0.5 wt. %. The ash content is preferably measured according to method L-02-00 of the company GK.

The moisture content of the graphite as used according to the invention is preferably in a range of from 0.01 to 1 wt. %, preferably from 0.1 to 0.5 wt. %, in particular below 0.4 wt. %. The moisture content is preferably measured according to a method of the company GK (L-01-00).

The graphite is present according to the invention in an amount of 0.01 to 10 wt. %, based on the weight of the vinyl aromatic polymer (inclusive of solid and, if any, liquid additives, but exclusive of propellant), preferably in a range of from 1.0 to 8.0 wt. %, more preferably in a range of from 1.5 to 7.0 wt. %, in particular in a range of from 2.0 to 6.0 wt. %, such as in a range of from 2.5 to 5.0 wt. %, e.g. in a range of from 3 to 4 wt. %.

Preferably, a) the silica and b) the graphite are used in a weight ratio a):b) in a range of from 1:1.5 to 1:8, more preferably a) the silica and b) the graphite are used in a weight ratio a):b) in a range of from 1:2 to 1:5, most preferably a) the silica and b) the graphite are used in a weight ratio a):b) of about 1:3.

The best performance in foams in terms of
i) decrease of thermal conductivity (the decrease being measured according to ISO 8301),
ii) increase in specific mechanical properties (the increase in compressive strength and in bending strength being measured in accordance with EN 13163) and
iii) improvement in self-extinguishing properties (the improvement being measured in accordance with EN ISO 11925-2, preferably, as measured in accordance with DIN 4102 B1, B2)

is achieved, accompanied by a reduction in the required content of graphite, when specifically Sidistar T120 from Elkem is present in combination with the natural graphite CR5995 from GK, in a weight ratio of about 1:3. Then it is possible to reduce the graphite content to about 3 wt. %, and to maintain the thermal conductivity at the same level as if 5 to 6% of graphite were used, whilst the mechanical properties are significantly improved, as compared to foam containing from 5 to 6 wt. % of graphite without addition of Sidistar T120.

The polymer used in accordance with all aspects of the invention is based on one (or more) vinyl aromatic monomer (s), preferably styrene, and optionally one or more comonomers, i.e. it is a homopolymer or a copolymer.

The addition to styrene, a co-monomer of a specific styrene comonomer possessing steric hindrance, in particular p-tert-butylstyrene, or alpha-methyl styrene comonomer, or some other sterically hindered styrene comonomer, may advantageously increase the glass transition temperature of such a vinyl aromatic copolymer. In such a manner, the addition of a specific styrene comonomer to the styrene monomer improves the thermal stability of vinyl aromatic copolymer, which subsequently leads to better dimensional stability of moulded blocks made thereof.

The vinyl aromatic copolymer as used in the present invention is preferably comprised of 1 to 99 wt. % of styrene monomer and correspondingly 99 to 1 wt. % of p-tert-butylstyrene monomer, as follows (amounts in wt. %, based on the total amount of monomer):

| Monomer | Preferred (wt. %) | More preferred (wt. %) | Most preferred (wt. %) |
| --- | --- | --- | --- |
| Styrene | 1-99 | 50-99 | 70-98 |
| p-tert-Butylstyrene | 99-1 | 1-50 | 30-2 |

Alternatively, the vinyl aromatic copolymer as used in the present invention is preferably comprised of 1 to 99 wt. % of styrene monomer and correspondingly 99 to 1 wt. % of alpha-methyl styrene monomer, as follows (amounts in wt. %, based on the total amount of monomer):

| Monomer | Preferred (wt. %) | More preferred (wt. %) | Most preferred (wt. %) |
| --- | --- | --- | --- |
| Styrene | 1-99 | 50-98 | 75-95 |
| alpha-methyl Styrene | 99-1 | 2-50 | 25-5 |

In addition to the mandatory components a) and b) above, the materials according to the invention (the polymer composition, the granulate, the foam and the masterbatch) may contain further additives, as is set out below.

For instance, the polymer foam preferably further comprises one or more athermanous additives selected from a) powder inorganic additive other than silica, b) powder carbonaceous additive other than graphite, and c) powder geopolymer or powder geopolymer composite. The powder inorganic additive is preferably selected from powders of calcium phosphate and mineral with perovskite structure. The powder carbonaceous additive is preferably selected from powders of carbon black, petroleum coke, graphitized carbon black, graphite oxides and graphene.

Calcium Phosphate

The calcium phosphate as typically used according to the invention has a particle size, as measured by laser diffraction, of 0.01 µm to 100 µm. It is preferred that the particle size is from 0.1 µm to 50 µm, such as 0.5 µm to 30 µm. The calcium phosphate is preferably tricalcium phosphate (specifically a type of hydroxyapatite).

According to the present invention, the calcium phosphate, if present, is preferably used in an amount of from 0.01 to 50 wt. %, based on the weight of vinyl aromatic polymer including solid and, if any, liquid additives, but exclusive of propellant, more preferably 0.1 to 15 wt. %, most preferably 0.5 to 10 wt. %, in particular 1 to 8 wt. %.

Perovskite

In a preferred embodiment of the present invention, the thermal conductivity (as measured according to ISO 8301) is decreased, the mechanical properties are improved (compressive and bending strengths are increased, as measured according to EN 13163) and/or the self-extinguishing properties are improved (as measured according to EN ISO 11925, or even as measured according to DIN 4102/B1, B2) in vinyl aromatic polymer foam, by use of a mineral of the general formula $ABX_3$, A and B being cations and X being anions, wherein the mineral has perovskite crystal structure (in the following "mineral having perovskite structure", or "perovskite"). This type of additive reduces flame development by the creation of char with higher viscosity and thus reduces dripping and flaming.

The preferred concentration of perovskite for a decrease of the thermal conductivity, an additionally increase of self-extinguishing and mechanical properties is in a range of from 0.01 to 50 wt. %, based on the weight of vinyl aromatic polymer in the granulate including solid and, if any, liquid additives, but exclusive of propellant, more preferably 0.05 to 25 wt. %, most preferably 0.1 to 15 wt. %, in particular 0.5 to 12 wt. %, such as 1 to 8 wt. %.

Preferably, A is selected from the group consisting of Ca, Sr, Ba, Bi, Ce, Fe, and mixtures thereof. Moreover, the A atom can be represented also by hybrid organic-inorganic groups, e.g. $(CH_3NH_3)^+$.

The B atom is preferably represented by Ti, Zr, Ni, Al, Ga, In, Bi, Sc, Cr, Pb as well as ammonium groups. The X atom is preferably represented by oxygen or halide ion, or mixtures thereof.

Among the most preferred representatives of perovskite structures are dielectric $BaTiO_3$, high-temperature semiconductor $YBa_2Cu_3O_{7-x}$, materials exhibiting magneto-resistance $R_{1-x}A_xMnO_3$, where $R=La^{3+}$, $Pr^{3+}$ or other earth ion, $A=Ca^{2+}$, $Sr^{2+}$, $Ba^{2+}$, $Bi^{2+}$, $Ce^{2+}$, and multiferroic materials.

Perovskites have large reflectance properties in the broad wavelength and a high optical constant, even in the far-infrared region. Hence, perovskites are infrared reflective materials that reflect infrared rays included in sunlight or the like and reduce the amount of absorbed energy in the infrared range.

A preferred perovskite has a BET surface size in the range of from 0.01 to 100 $m^2/g$, as measured according to the standards ASTM C1069 and ISO 9277 as explained above. The BET active surface is preferably in a range of from 0.05 to 50 $m^2/g$ and more preferable in a range of from 0.1 to 15 $m^2/g$.

Typical perovskites have an average particle size in a range of from 0.01 to 100 μm, as measured according to the standard procedure using a Malvern Mastersizer 2000 apparatus. The average particle size is preferably in a range of from 0.1 to 50 μm, more preferably in a range of from 0.5 to 30 μm.

Geopolymer

It has further been found that it is possible to maintain the foam's self-extinguishing and mechanical properties in the same range as in an expanded polymer without addition of filler or any other athermanous additive, while at the same time the thermal conductivity can be decreased significantly, namely by addition of a geopolymer, or a geopolymer composite prepared from geopolymer and various types of athermanous fillers. This is possible because the geopolymer itself gives fire resistance, and may in the composite encapsulate the particles of athermanous additive, especially those additives based on carbon, and separates them from any interactions with the flame, the polymer or the flame retardant. Geopolymer and geopolymer composite further decrease thermal conductivity, based on a heat radiation scattering effect.

Geopolymer synthesis from aluminosilicate materials takes place by the so-called geopolymerization process, which involves polycondensation phenomena of aluminates and silicate groups with formation of Si—O—Al-type bonds. In a preferred embodiment, geopolymers encapsulate carbon-based athermanous fillers in a matrix and limit the contact (interphase) between carbon-based filler and brominated flame-retardants, including those based on polystyrene-butadiene rubbers. This phenomenon allows a significant decrease of the required concentration of brominated flame retardant in expandable vinyl aromatic polymer composites.

A preferred geopolymer composite is prepared by a process wherein an athermanous additive component is present during the production of geopolymer composite, so that the geopolymer composite incorporates the athermanous additive component. Preferably, this athermanous additive component comprises one or more athermanous additives selected from the group consisting of
  a. carbon black, petroleum coke, graphitized carbon black, graphite oxides, various types of graphite (especially poor and amorphous forms with a carbon content in the range of from 50 to 90%) and graphene, and
  b. titanium oxides, ilmenite, rutiles, chamotte, fly ash, fumed silica, hydromagnesite/huntite mineral, barium sulfate and mineral with perovskite structure, preferably the athermanous additive component comprises one or more carbon-based athermanous additives selected from the group of heat absorbers and heat reflectors,
in particular the athermanous additive component is carbon black, graphite, or a mixture thereof.

Further details of the preparation of geopolymer composite may be found in the international application entitled "Geopolymer and composite thereof and expandable vinyl aromatic polymer granulate and expanded vinyl aromatic polymer foam comprising the same", PCT/EP2016/050594, filed on even date herewith.

Moreover, further carbon-based athermanous additives (other than the specific type of graphite) can be present in the foam, such as carbon black, petroleum coke, graphitized carbon black, graphite oxides, and graphene.

Carbon Black

The carbon black as preferably used according to the invention has a BET surface, as measured according to ASTM 6556, of more than 40 to 250 $m^2/g$.

It is preferred that the BET surface of the carbon black as used according to the invention is from 41 to 200 $m^2/g$, preferably from 45 to 150 $m^2/g$, in particular from 50 to 100 $m^2/g$.

The sulphur content of the carbon black as preferably used according to the invention is in the range of from 50 to 20,000 ppm, as measured according to ASTM D1619, preferably from 3,000 to 10,000 ppm.

The carbon black is preferably present in an amount of 0.1 to 12 wt. %, based on the weight of the vinyl aromatic polymer including additives, but exclusive of propellant, preferably 0.2 to 12.0 wt. %, more preferred 0.5 to 9.0 wt. %, such as 1.0 to 8.0 wt. %, in particular 2.0 to 7.0 wt. %, such as 3.0 to 6.0 wt. %, e.g. about 5.0 wt. %.

In the following, a) the specific type of silica and b) the specific type of graphite will be referred to as the mandatory athermanous fillers or additives. The further athermanous fillers that are preferably present, namely s) one or more of calcium phosphate, mineral with perovskite structure, and geopolymer and/or geopolymer composite, and t) one or more of carbon black, petroleum coke, graphitized carbon black, graphite oxides, and graphene, will be referred to as optional athermanous fillers or additives.

The foam also preferably comprises one or more of nucleating agent, flame retardant, synergist, thermal oxidative stabiliser, flame retardant thermal stabiliser, and dispersion aid.

For instance, the flame retardant system is, especially in an extrusion process, usually a combination of two types of compounds, namely x) a brominated aliphatic, cycloaliphatic, aromatic or polymeric compound containing at least 50 wt. % of bromine, and a second compound (so called synergistic compound, y) which can be bicumyl (i.e. 2,3-dimethyl-2,3-diphenylbutane) or 2-hydroperoxy-2-methylpropane, or dicumyl peroxide, cumene hydroxide, or 3,4-dimethyl-3,4-diphenylbutane.

The total content of flame retardant system, i.e. x) plus y), is typically in a range of from 0.1 to 5.0 wt. % based on the weight of vinyl aromatic polymer including solid and, if any, liquid additives, but exclusive of propellant, preferably between 0.2 and 3 wt. %. The weight-to-weight ratio of bromine compound x) to synergistic compound y) is preferably in a range of from 1:1 to 15:1, usually in a range of from 3:1 to 10:1, in particular from 2:1 to 7:1.

In a further aspect, the invention relates to (II) processes for the preparation of expandable polymer granulate.

In a first embodiment (IIa), the process is a process for the preparation of expandable polymer granulates comprising the following steps:
  i) feeding vinyl aromatic polymer into an extruder,
  ii) adding a) the silica and b) the graphite, and optionally thermal stabiliser and flame suppressant,
  iii) injecting blowing agent into the melt of polymer,
  iv) extruding the homogenous blend, and
  v) pelletizing the blend in an underwater pelletizer, so as to obtain the granulate.

Preferably, the extrusion process (IIa) comprises the steps:
  i) feeding a first polymer component comprising vinyl aromatic polymer into a first mixer;
  ii) feeding a first additive component a) into the first mixer, to produce a first mixture from the first polymer component and the first additive component;
  iii) feeding a second polymer component b) comprising vinyl aromatic polymer into a second mixer;
  iv) feeding a second additive component b) into the second mixer, to produce a second mixture from the second polymer component and the second additive component, wherein the processing conditions in the second mixer are more severe than the processing conditions in the first mixer, by providing higher shear force;
  v) combining the first and second mixtures, to produce a third mixture;
  vi injecting blowing agent c) into the third mixture, to produce a fourth mixture;
  vii) mixing the fourth mixture; and
  viii) pelletizing the fourth mixture, to obtain the granulate.

The first polymer component can be a vinyl aromatic polymer having a melt index from 4 to 20 g/10 min, as measured according to ISO 1133.

The second polymer component can be a vinyl aromatic (e.g. styrene) homopolymer (or preferably copolymer with p-tert butyl styrene or alpha-methyl styrene), having a melt index ranging from 4 to 30 g/10 min, as measured according to ISO 1133.

According to this first and preferred embodiment of the second aspect, the invention allows for the separate addition of first and second additive components into a mixture that is ultimately charged with propellant and is pelletized, so as to obtain the expandable granulate. Because of the separate addition of the first and second additive components, the process is highly flexible and allows for the processing of additives that have very different processing requirements, in particular in view of their stability under those processing conditions that are necessary so that the different additive components can best perform their desired function. Typically, at least a part (and preferably all) of the a) silica and/or b) graphite as defined above is introduced as part of the second additive component in this extrusion process, whereas at least a part (and preferably all) of the flame retardant system is introduced as part of the first additive component in this extrusion process. This is advantageous since the flame retardant system typically requires more moderate processing conditions, in particular as compared to a) silica and b) graphite. Thus, according to the invention, a mixture comprising a) silica and b) graphite can be prepared in a dedicated mixer that provides for the high shearing that is preferred for these types of additives, so that they are properly dispersed.

As a first alternative, the second additive components (e.g. the mandatory and optional athermanous fillers) can be mixed with polymer, in equipment that provides for high shearing and good dispersion, and the obtained mixture is directly, i.e. as a melt, combined with the mixture containing the first additive components, to give a mixture that is ultimately charged with blowing agent.

As a second alternative, the second additive components (e.g. the mandatory and optional athermanous fillers) can be mixed with polymer and be provided as a masterbatch. Such a masterbatch is advantageous in case the plant design does not allow for the processing conditions that are preferable for the a) silica and/or b) graphite, e.g. high shearing conditions. The masterbatch can for instance be prepared off-site, in dedicated processing equipment, and having to provide such processing equipment on site can be dispensed with. The masterbatch comprising the mandatory and optional athermanous fillers is subject of the fifth aspect of the present invention, and is described below.

According to a second embodiment of the second aspect (IIb), expandable polymer granulates is prepared in an aqueous suspension polymerization process comprising the steps:
  i) adding a vinyl aromatic monomer and optionally one or more) comonomers to the reactor, and subsequently adding
    i1) optional polymeric suspension aid,
    i2) athermanous fillers (mandatory and optional ones),
    i3) flame retardant,
    i4) at least one peroxide (or the mixture of two or more peroxides) as reaction initiator,
  ii) adding the demineralised water, and
    ii1) at least one suspending agent which is an inorganic acid salt,
    ii2) at least one peroxide (or the mixture of two or more peroxides) as reaction initiator,
    ii3) at least one suspension stabilizer selected from the group of anionic surface active compounds and/or high molecular weight compounds (e.g. hydrophilic and/or amphiphilic polymers), and
  iii) continuing the polymerization (preferably until the concentration of vinyl aromatic monomer(s) is below 1000 ppm by weight, based on the weight of the polymer),
  iv) adding the blowing agent during or after the polymerization step,
  v) cooling, and then separating the granulate from the water.

The athermanous fillers that are mandatory according to the present invention (namely a) silica, and b) graphite) may be added in the form of a masterbatch, they may be introduced at the beginning of the suspension polymerization process, or may be dissolved in the monomer and/or a mixture of the monomer and comonomer. The same applies for the optional athermanous fillers, s) and t) as mentioned above.

According to the present invention, the mandatory and the optional athermanous fillers are introduced as athermanous fillers i2), and they may also be introduced in step ii) and/or in step iii) of this suspension process.

The polymer granulate is prepared using well known inorganic salts of phosphoric acid, such as types of calcium phosphate, magnesium phosphate, or a combination of salts as suspending agents. These salts may be added to the reaction mixture in a finely divided form, or as a product of an in situ reaction (for example, between sodium phosphate and magnesium sulphate).

The salts are supported in their suspending action by anionic surface-active compounds, such as sodium dodecylobenzene sulfonate or sodium poly(naphthalene formaldehyde) sulfonate. Those surface-active compounds can be also being prepared in situ using their precursors such as sodium metabisulfite and potassium persulfate. The suspension can be also stabilized by high molecular weight organic polymers, such as polyvinyl alcohol or hydroxyethylcellulose or hydroxypropylmethyl-cellulose.

To improve the stability of the suspension, up to 30 wt. % of polymer (fresh vinyl aromatic polymer or waste vinyl aromatic polymer from a previous polymerization) may be added as the optional suspension aid, preferably 5 to 15 wt. %, based on the vinyl aromatic monomer amount. It increases the viscosity of the reagent mixture (monomer with all additives), which facilitates the creation of a suspension. The same or similar effect can be achieved by mass pre-polymerization of the monomer or mixture of comonomers and additives until the suitable melt viscosity is obtained (as for 1% to 30% of polymer concentration).

In the most preferred process, before start of the polymerization step iii), athermanous fillers in the form of a concentrated masterbatch are added to the styrene and/or its mixture with comonomer, particularly p-tert-butylstyrene. The masterbatch can contain from 10 to 60% of athermanous fillers, the mandatory ones, a) and b), and the optional ones, s) and t), pre-silanized or silanized in the masterbatch compounding process by e.g. triethoxy(phenyl)silane, to decrease its hydrophilic properties.

The polymerization is then continued in an aqueous suspension phase, in the presence of the above-mentioned suspending agents, suspension stabilizers, athermanous fillers, flame retardants and suppressors, optionally at least in the presence of suspension aid.

The polymerization process is triggered by initiators. Normally, two organic peroxides are used as initiators. The first peroxide, with a half-life of about one hour at 80-95° C., is used to start and run the reaction. The other, with a half-life of about one hour at 105-125° C., is used during the following polymerization process continued in the higher temperature, so called high temperature cycle (HTC). For above specific process with the presence of carbon black was used composition of three peroxides to achieve suitable average molecular weight despite negative inhibiting effect caused by the carbon black presence. Preferably were used: dicumyl peroxide and tert-butylperoxy-2-ethyl hexyl carbonate peroxide as high temperature cycle peroxides (120° C.) and tert-butyl 2-ethylperoxyhexanoate as low temperature cycle peroxide (82-90° C.)

The end of the process is typically indicated by a concentration of residual vinyl monomer(s) of below 1000 ppm by weight, based on the mass of vinyl aromatic polymer or copolymer. The vinyl aromatic polymer or copolymer which is obtained at the end of the process typically has an average molecular mass (Mw) ranging from 50 to 600 kg/mol, preferably from 150 to 450, most preferably from 100 to 350 kg/mol. The procedure for controlling molecular mass in suspension polymerization is well known and is described in detail in Journal of Macromolecular Science, Review in Macromolecular Chemistry and Physics C31 (263) p. 215-299 (1991).

During the polymerization process, conventional additives can be added directly to the monomer(s), their solution with suspension aid, to the pre-polymer, or to the suspension. Additives such as the flame retardant system, nucleating agents, antistatic agents, blowing agents and colorants stay in the polymer drops during the process and are thus present in the final product. The concentrations of conventional additives are the same as for the extrusion process, as set out above.

The flame retardant systems suitable for the present suspension process are similar to those used in the extrusion process described above. One suitable system is the combination of two types of compounds, namely a brominated aliphatic, cycloaliphatic, aromatic or polymeric compound containing at least 50 wt. % of bromine (such as hexabromocyclododecane, pentabromomonochlorocyclohexane, or a polymeric bromine compound, specifically brominated styrene-butadiene rubber) and a second compound called synergistic compound which can be e.g. an initiator or peroxide (dicumyl peroxide, cumene hydroxide, and 3,4-dimethyl-3, 4-diphenylbutane). The content of flame retardant system is typically in a range of from 0.1 to 5.0 wt. % with respect to the total weight of vinyl aromatic polymer (weight of monomer(s) plus weight of polymer if added on the start), preferably between 0.2 and 3 wt. %. The ratio between bromine compound and synergistic compound is preferably in a range of from 1:1 to 15:1 weight to weight, usually from 3:1 to 5:1.

The blowing agent or agents are preferably added during the polymerization to the suspension phase and are selected from aliphatic or cyclic hydrocarbons containing from 1 to 6 carbons and their derivatives. Typically are used n-pentane, cyclopentane, i-pentane, combination of two of them or their mixture. In addition, the halogenated aliphatic hydrocarbons or alcohols containing from 1 to 3 carbons are commonly used. The blowing agent or agents can also be added after the end of polymerization.

At the end of the polymerization, spherical particles of expandable styrenic polymer are obtained as granulate, with an average diameter range of 0.3 to 2.3 mm, preferably from 0.8 to 1.6 mm. The particles can have different average molecular mass distribution, depending on their size, but all contain used additives dispersed homogenously in the polymer matrix.

In the final step after the HTC step, the mass is cooled down to e.g. 35° C., and the polymer granulate is separated from the water, preferably in a centrifuging process. The particles are then dried and preferably coated with a mixture of mono- and triglycerides of fatty acids and stearic acid salts.

After discharging the particles from the reactor, they are typically washed: first with water, then with non-ionic surfactant in aqueous solution, and finally again with water; they are then desiccated and dried with hot air having a temperature in the range 35-65° C.

The final product is typically pre-treated by applying a coating (the same as for the extruded granulate) and can be expanded by the same method as the extrusion product.

According to a third embodiment of the second aspect (IIc), expandable polymer granulate is prepared in a continuous mass process comprising the following steps:
  i) providing continuously to a mass prepolymerization reactor (or the first from a cascade reactor) a stream of:
    i1) vinyl aromatic monomer and optionally at least one comonomer (preferably p-tert-butylstyrene),
    i2) at least one additive solution, and
    i3) optionally recycled monomer,
  ii) continuing polymerization in the prepolymerization reactor or the sequence of cascade reactors, iii) adding athermanous fillers (mandatory and optional ones), iv) degassing the polymer, v) feeding the polymer in molten state into the extruder, preferably directly from the polymerization plant, vi) optionally adding a flame retardant system including synergist and thermal stabilisers, vii) injecting the blowing agent, viii) extruding the homogenous polymer mixture, and ix) pelletizing in an underwater pelletizer, so as to obtain the granulate.

The reactor or cascade reactor is preferably arranged horizontally. If a cascade reactor is used, then there are preferably up to 5 reactors, in particular up to 4, such as three reactors.

The continuous mass polymerization is process congruous to the extrusion process, but the vinyl aromatic polymer or copolymer together with athermanous fillers is used in a molten state and the extruder is fed directly by the polymerization plant.

The mass polymerization reactor (or first from cascade reactors) is fed continuously by vinyl aromatic monomer, particularly styrene, and optionally by its vinyl aromatic comonomer, for instance p-tert-butylstyrene.

At this stage, athermanous fillers in the form of a masterbatch or in the form of powders are fed into the mass polymerisation reactor, one or more additives and optionally recycled monomer recovered from the process.

The athermanous additives (e.g. masterbatches) are preferably dissolved in the vinyl aromatic monomer or before feed to the polymerization reactor.

The polymerisation reaction is initiated thermally, without addition of initiators. In order to facilitate heat collection, polymerisation is generally carried out in the presence of for instance monocyclic aromatic hydrocarbon.

The prepolymerised mass from the pre-polymerisation reactor is pumped through the sequence of several horizontal reactors, and the polymerisation reaction is subsequently continued.

At the end of the mass polymerization stage, the rest of unpolymerized monomer is removed by degassing of the melt.

A vinyl polymer in the molten state, produced in mass polymerization and containing athermanous fillers, is fed into an extruder at a temperature in a range of from 100 to 250° C., preferably from 150 to 230° C. In the next stage, the flame retardant system and the nucleating agent are fed to the polymer melt. Again, a combination of two types of flame retarding compounds can be used, namely a brominated aliphatic, cycloaliphatic, aromatic or polymeric compound containing at least 50 wt. % of bromine, and a second compound called synergistic compound, which can be bicumyl (2,3-dimethyl-2,3-diphenylbutane) or 2-hydroperoxy-2-methylpropane. The concentrations of additives are typically the same as for the extrusion process, as set out above.

In the following step, the blowing agent is injected into the molten polymer mixture and mixed. The blowing agent or agents are the same as for the suspension process, i.e. selected from aliphatic or cyclic hydrocarbons containing from 1 to 6 carbons and their derivatives. The polymer with all additives and blowing agent is subsequently extruded to give expandable beads.

The homogenous polymer mixture comprising additives and blowing agent is pumped to the die, where it is extruded through a number of cylindrical die holes with 0.5-0.8 mm of diameter, immediately cooled by a water stream and cut with a set of rotating knives in a pressurized underwater pelletizer, to obtain micropellets (granulate).

The micropellets are transported by water, washed, drained off and fractioned. The final product is pre-treated in the same way as it is in the suspension and extrusion processes.

In a further aspect, the invention relates to (III) expandable polymer granulate comprising one or more propellants, a) the silica, b) the graphite and c) vinyl aromatic polymer, wherein the silica and the graphite are present in a weight ratio in a range of from 1:1 to 1:10.

Preferably, the expandable polymer granulate is obtainable (and is more preferably obtained) by the process according to the second aspect.

Preferably, the expandable polymer granulate further comprises one or more of the optional athermanous additives s) and t) above, more preferably the expandable polymer granulate further comprises one or more additives selected from s) powders of calcium phosphate, mineral with perovskite structure, geopolymer and geopolymer composite, and t) carbon black, petroleum coke, graphitized carbon black, graphite oxides, and graphene.

In a further aspect, the invention relates to (IV) expanded polymer foam comprising a) silica, b) graphite and c) vinyl aromatic polymer, wherein the silica and the graphite are present in a weight ratio in a range of from 1:1 to 1:10, the foam having a density of 8 to 30 kg/m$^3$, and a thermal conductivity of 25-35 mW/K·m.

The expanded polymer foam is preferably obtainable (and is most preferably obtained) by expansion of the expandable polymer granulate according to the third aspect.

According to the fifth aspect, the invention relates to (V) a masterbatch. The masterbatch comprises a) the specific silica, b) the specific graphite, and c) vinyl aromatic polymer, and the total amount of a) and b) (i.e. the sum of the amounts of a) the silica and b) the graphite, respectively) is in a range of from 10 to 70 wt. %, based on the weight of the masterbatch.

In a general embodiment, a) the silica and b) the graphite need not necessarily be present in the masterbatch in a weight ratio in a range of from 1:1 to 1:10, as part of a) the silica and/or b) the graphite may be introduced into the process by other means, i.e. without being present in the masterbatch.

However, in a preferred embodiment, a) the silica and b) the graphite are present in the masterbatch in a weight ratio in a range of from 1:1 to 1:10. This will provide the advantageous mandatory additives in the advantageous ratio to the process (II). More preferably, a) the silica and b) the graphite are used in a weight ratio a):b) in a range of from 1:1.5 to 1:8, most preferably a) the silica and b) the graphite are used in a weight ratio a):b) in a range of from 1:2 to 1:5, in particular a) the silica and b) the graphite are used in a weight ratio a):b) of about 1:3.

Preferably, the total amount of a) and b) is in a range of from 10 to 65 wt. %, based on the weight of the masterbatch, more preferably from 20 to 60 wt. %, in particular from 25 to 55 wt. %.

In a preferred embodiment, c) is a vinyl aromatic polymer having a melt index in a range of from 4 to 30 g/10 min, as measured according to ISO 1133, and the vinyl aromatic polymer is preferably a homopolymer or copolymer with p-tert butyl styrene or alpha-methyl styrene.

The masterbatch may, in addition to the mandatory components a) silica, b) graphite, and c) vinyl aromatic polymer, comprise further components, such as one or more of the optional athermanous additives s) and t). Preferred optional athermanous fillers that are preferably present in the masterbatch are s) one or more of calcium phosphate, mineral with perovskite structure, and geopolymer and/or geopolymer composite, and t) one or more of carbon black, petroleum coke, graphitized carbon black, graphite oxides, and graphene. These optional athermanous fillers very often require processing conditions that are similar to silica and graphite.

Moreover, the masterbatch preferably comprises one or more silanes. Preferred silanes are for example aminopropyltriethoxysilane (e.g. Dynasylan AMEO from Evonik), aminopropyltrimethoxysilane (e.g. Dynasylan AMMO from Evonik), and phenyltriethoxysilane (e.g. Dynasylan 9265 from Evonik).

Preferably, the amount of silane is in a range of from 0.01 to 1 wt. %, based on the weight of the athermanous additive in the masterbatch.

It is noted that, unlike the properties of the additives as starting materials, the properties of additives as contained in granulate or foam are notoriously difficult to determine.

It is often considered more appropriate in the art to characterize the additives in granulate and foam with reference to the properties of the additives as initially used.

The advantages of the present invention become apparent from the following examples. Unless indicated otherwise, all percentages are given by weight.

Moreover, whenever reference is made in the present description of the invention to an amount of additive "by weight of vinyl aromatic polymer", this refers to the amount of the additive by weight of polymer component inclusive of (solid and, if any, liquid) additives, but exclusive of propellant.

EXAMPLES

In Accordance with the Invention, Expandable Polymer Granulate was Prepared in an Extrusion Process, with Addition of Athermanous Fillers in Powder Form (Examples 1 to 8):

Example 1 (Comparative)

A mixture of vinyl aromatic polymer in the form of granules, containing 2.0 wt. % of polymeric brominated flame retardant (Emerald 3000), 0.4 wt. % of bicumyl, Irganox 1010 in an amount of 0.1 wt. %, Irgafos 126 in an amount of 0.1 wt. % and Epon 164 in an amount of 0.2 wt. % were dosed to the main hopper of the main 32D/40 mm twin-screw co-rotating extruder. The melt temperature in the main extruder was 180° C.

The graphite powder (CR CR5995 from company GK) in an amount of 3 wt. %, based on total weight of granulate, excluding propellant, was dosed to the side arm (54D/25 mm) twin-screw co-rotating extruder via one side feeder and the vinyl aromatic polymer (in the form of granules) was dosed to the main hopper of this extruder. The melt containing 30 wt. % of concentrated graphite was transported to the main extruder. The melt temperature inside the extruder was 190° C.

The blowing agent (n-pentane/isopentane mixture 80/20%) was injected to the main 32D/40 mm extruder downstream from the injection of the melt from the side twin-screw extruder. The concentration of blowing agent was 5.5 wt. %, calculated on total mass of product.

The melt of vinyl aromatic polymer containing flame retardant, bicumyl, graphite and blowing agent was transported to the 30D/90 mm cooling extruder and pumped through a 60 mm length static mixer, melt pump, screen changer, diverter valve and extruded through the die head with 0.75 mm diameter holes, and underwater pelletized by the rotating knifes. Downstream, the rounded product, a granulate with a particle size distribution of 99.9% of the fraction 0.8-1.6 mm was centrifuged to remove the water, and was finally coated with a mixture of magnesium stearate with glycerine monostearate and tristearate. The melt temperature in the cooling extruder was 170° C.

The coated beads were expanded to measure the final general properties of expanded foam composite:
thermal conductivity according to standard ISO 8301.
mechanical properties (compressive and bending strength) according to standard EN 13163.
flammability according to tests methods: EN ISO 11925-2 and DIN 4102 B1, B2.

Example 2 (According to the Invention)

The components according to Example 1 were used. Additionally, a spherically-shaped amorphous silicon dioxide from ELKEM (Sidistar T120 as specified above) in an amount of 1 wt. % was used. The silica powder was initially mixed together with the graphite powder and the mixture was then dosed to the side arm (54D/25 mm) twin-screw co-rotating extruder via one side feeder. The melt in the side extruder was in that case 40 wt. % concentrated.

Example 3 (Comparative)

The components according to Example 1 were used. Graphite (CR5995) in an amount of 4 wt. % was used.

Example 4 (According to the Invention)

The components according to Example 3 were dosed and the spherically-shaped amorphous silicon dioxide from ELKEM (Sidistar T120 as specified above) was added in an amount of 1.3 wt. %. The melt in side extruder was in that case 40 wt. % concentrated.

Example 5 (Comparative)

The components according to Example 1 were dosed. The graphite (CR5995) content was increased to 5 wt. %. This example was performed especially to show that better foam properties are actually obtained in Examples 2 and 4 where the graphite content was lower and Sidistar silica was used.

Example 6 (Comparative)

The components according to Example 1 were used. Irganox 1010, Irgafos 126 and Epon 164 were not added.

Example 7 (According to the Invention)

The components according to Example 2 were used. Irganox 1010, Irgafos 126 and Epon 164 were not added.

Example 8 (According to the Invention)

The components according to Example 4 were used. Irganox 1010, Irgafos 126 and Epon 164 were not added.

TABLE 1

Summary of Examples 1 to 8.

| Components (wt. %) | 1* | 2 | 3* | 4 | 5* | 6* | 7 | 8 |
|---|---|---|---|---|---|---|---|---|
| GP585X | + | + | + | + | + | + | + | + |
| Graphite GK CR5995 | 3 | 3 | 4 | 4 | 5 | 3 | 3 | 4 |
| Sidistar T120 | — | 1 | — | 1.3 | — | — | 1 | 1.3 |
| Emerald 3000 | 2.0 | 2.0 | 2.0 | 2.0 | 2.0 | 2.0 | 2.0 | 2.0 |
| Bicumyl | 0.4 | 0.4 | 0.4 | 0.4 | 0.4 | 0.4 | 0.4 | 0.4 |
| Irganox 1010 | 0.1 | 0.1 | 0.1 | 0.1 | 0.1 | — | — | — |
| Irgafos 126 | 0.1 | 0.1 | 0.1 | 0.1 | 0.1 | — | — | — |
| Epon 164 | 0.2 | 0.2 | 0.2 | 0.2 | 0.2 | — | — | — |
| Polywax 2000 | 0.3 | 0.3 | 0.3 | 0.3 | 0.3 | 0.3 | 0.3 | 0.3 |
| Pentane/Iso-pentane 80/20 | 5.5 | 5.5 | 5.5 | 5.5 | 5.5 | 5.5 | 5.5 | 5.5 |

*Comparative Example

TABLE 2

Examples 1 to 8.
Final product parameters at a foam density of ca. 19.0 g/l.

| Examples | 1* | 2 | 3* | 4 | 5* | 6* | 7 | 8 |
|---|---|---|---|---|---|---|---|---|
| Thermal conductivity (mW/m · K)/ISO 8301/ | 30.8 | 30.2 | 30.4 | 29.7 | 30.1 | 31.0 | 30.4 | 29.0 |
| Flammability/ EN ISO 11925-2/ | + | + | + | + | + | + | + | + |
| Flammability/ DIN 4102 B1/B2/ | +/+ | +/+ | +/+ | +/+ | +/+ | +/+ | +/+ | +/+ |
| Compressive strength at 10% def. (kPa)/EN 13163/ | 106 | 118 | 98 | 117 | 94 | 98 | 120 | 118 |
| Bending strength (kPa)/EN 13163/ | 170 | 196 | 166 | 202 | 160 | 169 | 200 | 201 |

Passed (+ or B2 or B1); Not passed (−)
*Comparative Example

Expandable Polymer Granulate was Further Prepared in an Extrusion Process, However with Addition of Athermanous Fillers in the Form of a Masterbatch (Examples 9 to 13):

Examples from 1 to 5 were repeated, with the difference that the mixture of graphite with silica was added to the main co-rotating twin-screw extruder in the form of a 40 wt. % concentrated masterbatch. In the example where graphite was used without silica, the masterbatch concentration was 30 wt. %. The masterbatches were prepared on the same extruder as the side arm co-rotating twin-screw extruder—54D/25 mm. Synthos PS 585X was used as masterbatch polymer carrier. The results are very similar to those obtained for Examples 1 to 5 above.

Expandable Polymer Granulate was Prepared in a Suspension Process (Examples 14 to 18):

Example 14 (According to the Invention)

20 000 kg of styrene were dosed to a 60 m³ reactor. The following components (calculated per weight of styrene) were then added: 4.0 wt. % of athermanous fillers silanized with 0.1 wt. % of silane—Dynasylan 9265 (including 3.0 wt. % of graphite CR5995 from company GK and 1.0 wt. % of silica Sidistar T120 from Elkem company) in the form of a 40 wt. % concentrated masterbatch based on Synthos PS 585X, 0.002 wt. % of divinylbenzene, 1 wt. % of Emerald 3000, 0.3 wt. % of Polywax 1000, and 0.5 wt. % of dicumyl peroxide.

The mixture was heated relatively quickly to a temperature of 70° C. and mixed at this temperature for 30 min with 275 rpm. Then, the temperature was increased to 90° C. and 30 000 kg of demineralised water (temperature of 60° C.) were added. The mixing force immediately created a suspension of prepolymer and the suspension was heated to 82° C. Immediately, 0.3 wt. % of Peroxan PO and 0.5 wt. % of TBPEHC were added. The radical polymerization was started and the following surfactant composition was introduced:

- potassium persulfate—0.0001 wt. %
- Poval 205-0.18 wt. % of 5% concentrated water solution
- Poval 217 (alternatively Poval 224)—0.09 wt. % of a 5 concentrated water solution
- DCloud 45-0.1 wt. %
- Arbocel CE 2910HE50LV—0.1 wt. % (hydroxypropyl-methyl-cellulose supplied by J. RETTENMAIER & SOHNE GMBH)

The polymerization was then continued for 120 min. at a temperature of 82° C., and the temperature was then increased to 90° C. The suspension was kept at this temperature for 120 min. to achieve particle identity point of suspension. A further portion of Poval 217 (in a concentration of 0.3 wt. % of a 5 wt. % concentrated solution in water) was introduced. In this step, sodium chloride can be added in an amount of 0.5 wt. % per water phase, to reduce the water content in the polymer. Alternatively, a surfactant (sodium dodecylbenzenesulfonate, SDBS) can be used in an amount of 0.2 wt. %.

The reactor was closed and the n-pentane/isopentane 80/20% mixture in an amount of 5.5 wt. % was added over 60 min. Simultaneously, the temperature was increased to 125° C. Then the polymerization was continued for 120 min. and after that time the suspension slurry was cooled down to 25° C.

The product was removed from the reactor and water was removed in a basket centrifuge. The particles were then dried in a fluid bed drier at a temperature of 40° C. for 30 min. and fractionated on 80% of particles fraction 0.8-1.6 mm, 15% of 0.3-1.3, 4% of 1.0-2.5 mm and 1% of upper and lower size. Fractions were then coated the same way as the product as obtained in the extrusion process, and then expanded to foam at 35° C. Then the polymer was centrifuged from water and dried in the fluid bed dryer. Finally, after sieving, the granulate was coated with a mixture of glycerol monostearate and glycerol tristearate.

Example 15 (According to the Invention)

This example is equivalent to Example 14 but the graphite (CR5995) was used in an amount of 4 wt. %, and silica (Sidistar T120) in an amount of 1.3 wt. %

Example 16 (Comparative)

This example was made according to Example 14; the silica was not used, and graphite was used in an amount of 3 wt. %.

Example 17 (Comparative)

This example was made according to Example 14; the silica was not used, and graphite was used in an amount of 4 wt. %.

Example 18 (Comparative)

This example was made according to Example 14; the silica was not used, and graphite was used in an amount of 5 wt. %.

TABLE 3

Summary of Examples 14 to 18.

| Components | Examples | | | | |
|---|---|---|---|---|---|
| (wt. %) | 14 | 15 | 16** | 17** | 18** |
| Graphite GK CR5995* | 3 | 4 | 3 | 4 | 5 |
| Sidistar T120* | 1 | 1.3 | — | — | — |
| Emerald 3000 | 1.0 | 1.0 | 1.0 | 1.0 | 1.0 |

*silanized with 0.1 wt. % of Dynasylan 9265
**Comparative Example

TABLE 4

Examples 14 to 18.
Final product parameters at a foam density of ca. 19.0 g/l.

| Examples | 14 | 15 | 16* | 17* | 18* |
|---|---|---|---|---|---|
| Thermal conductivity (mW/m · K)/ISO 8301 | 30.1 | 29.5 | 30.7 | 30.2 | 29.8 |
| Flammability/EN ISO 11925-2/ | + | + | + | + | + |
| Flammability/DIN 4102 B1/B2/ | +/+ | +/+ | +/+ | +/+ | −/+ |
| Compressive strength at 10% def. (kPa)/EN 13163/ | 110 | 107 | 99 | 95 | 91 |
| Bending strength (kPa)/EN 13163/ | 185 | 179 | 170 | 168 | 160 |

Passed (+ or B2 or B1);
Not passed (−)
*Comparative Example

Expandable Polymer Granulate was Prepared in a Continuous Mass Polymerization Process (Examples 19 to 24):

Example 19 (According to the Invention)

Continuous mass polymerization was carried out in three reactors in cascade. The polymerization of styrene was initiated by heating. The powder forms of graphite (CR5995) and silica (Sidistar T120), both silanized with 0.1 wt. % of silane—Dynasylan 9265, were added to the first reactor in a total amount of 4 wt. % (3 wt. % of graphite and 1 wt. % of silica). After polymerization and degassing of the polymer melt, the flame retardant was added in a concentration of 1.5 wt. %, together with: bicumyl in a concentration of 0.3 wt. %, Irganox 1010 in an amount of 0.075 wt. %, Irgafos 126 in an amount of 0.075 wt. %, Epon 164 in an amount of 0.15 wt. % and nucleating agent—Polywax 2000 in a concentration of 0.3 wt. %, directly to the extruding raw polystyrene. An extrusion was performed in similar like extruder 32D/40 mm attached to the degassing unit. During the process, pentane in admixture with isopentane (80/20%) in a concentration of 5.5 wt. % was dosed into the extruder. The granulate form was obtained by means of underwater pelletizing.

Example 20 (According to the Invention)

This example is equivalent to Example 19, but the graphite (CR5995) was used in an amount of 4 wt. %, and the silica (Sidistar T120) in an amount of 1.3 wt. %

Example 21 (Comparative)

This example was made according to Example 19; the silica was not used, and graphite was used in an amount of 3 wt. %.

Example 22 (Comparative)

This example was made according to Example 19; the silica was not used, and graphite was used in an amount of 4 wt. %.

Example 23 (Comparative)

This example was made according to Example 19; the silica was not used, and graphite was used in an amount of 5 wt. %.

Example 24 (According to the Invention)

This example was made according to Example 19, but Irganox 1010, Irgafos 126 and Epon 164 were not added.

TABLE 5

Summary of Examples 19 to 24.

| Components | Examples | | | | | |
|---|---|---|---|---|---|---|
| (wt. %) | 19 | 20 | 21** | 22** | 23** | 24 |
| GP585X | + | + | + | + | + | + |
| Graphite GK CR5995* | 3 | 4 | 3 | 4 | 5 | 3 |
| Sidistar T120* | 1 | 1.3 | — | — | — | 1 |
| Emerald 3000 | 1.5 | 1.5 | 1.5 | 1.5 | 1.5 | 1.5 |
| Bicumyl | 0.3 | 0.3 | 0.3 | 0.3 | 0.3 | 0.3 |
| Irganox 1010 | 0.075 | 0.075 | 0.075 | 0.075 | 0.075 | — |
| Irgafos 126 | 0.075 | 0.075 | 0.075 | 0.075 | 0.075 | — |
| Epon 164 | 0.150 | 0.150 | 0.150 | 0.150 | 0.150 | — |
| Polywax 2000 | 0.3 | 0.3 | 0.3 | 0.3 | 0.3 | 0.3 |
| Pentane/ Isopentane 80/20 | 5.5 | 5.5 | 5.5 | 5.5 | 5.5 | 5.5 |

*silanized with 0.1 wt. % of Dynasylan 9265
**Comparative Example

TABLE 6

Examples 19 to 24.
Final product parameters at a foam density of ca. 19.0 g/l.

| Examples | 19 | 20 | 21* | 22* | 23* | 24 |
|---|---|---|---|---|---|---|
| Thermal conductivity (mW/m · K)/ISO 8301 | 30.3 | 29.9 | 31.1 | 30.5 | 30.1 | 30.2 |
| Flammability/ EN ISO 11925-2/ | + | + | + | + | + | + |
| Flammability/ DIN 4102 B1/B2/ | +/+ | +/+ | +/+ | +/+ | −/+ | −/+ |
| Compressive strength at 10% def. (kPa)/EN 13163/ | 116 | 115 | 106 | 98 | 90 | 114 |
| Bending strength (kPa)/EN 13163/ | 198 | 200 | 172 | 167 | 162 | 194 |

Passed (+ or B2 or B1); Not passed (−)
*Comparative Example

The examples show that the foams as prepared according to the invention not only have low thermal conductivity, but they also have good mechanical and self-extinguishing properties.

The invention claimed is:

1. Expandable polymer granulate comprising one or more propellants, a) silica, b) graphite and c) polystyrene homopolymer or copolymer, wherein
   a) the silica is amorphous and has
      a BET surface of from 1 to 100 m$^2$/g,
      an average particle size in a range of from 3 nm to 1,000 nm, and
   the silica is present in an amount of from 0.01 to less than 2 wt. %, based on the weight of the polymer (inclusive of solid and, if any, liquid additives, but exclusive of propellant), and
   b) the graphite has
      a carbon content in a range of from 50 to 99.99 wt. % and
      a particle size in a range of from 0.01 to 100 µm, and
   the graphite is present in an amount in a range of from 0.01 to 10 wt. %, based on the weight of the polystyrene homopolymer or copolymer (inclusive of solid and, if any, liquid additives, but exclusive of propellant)
   wherein the silica and the graphite are present in a weight ratio in a range of from 1:1.5 to 1:10.

2. The expandable polymer granulate of claim 1, wherein the granulate is obtainable by a process comprising the following steps:
   i) providing continuously to a mass prepolymerization reactor (or the first from a cascade of reactors) a stream of:
      i1) polystyrene homopolymer or copolymer and optionally at least one comonomer,
      i2) at least one additive solution, and
      i3) optionally recycled monomer,
   ii) continuing polymerization in the prepolymerization reactor or the sequence of cascade reactors,
   iii) addition of athermanous fillers: a) silica and b) graphite, and optionally further additives,
   iv) degassing the polymer,
   v) feeding the polymer in molten state into the extruder,
   vi) optionally adding a flame retardant system including synergist and thermal stabilisers,
   vii) injecting blowing agent,
   viii) extruding the homogenous polymer blend, and
   ix) pelletizing in an underwater pelletizer, so as to obtain the granulate,
   wherein
      a) the silica is amorphous and has
         a BET surface of from 1 to 100 m$^2$/g,
         an average particle size in a range of from 3 nm to 1,000 nm, and
      the silica is present in an amount of from 0.01 to less than 2 wt. %, based on the weight of the polymer (inclusive of solid and, if any, liquid additives, but exclusive of propellant), and
      b) the graphite has
         a carbon content in a range of from 50 to 99.99 wt. % and
         a particle size in a range of from 0.01 to 100 µm, and
      the graphite is present in an amount in a range of from 0.01 to 10 wt. %, based on the weight of the polystyrene homopolymer or copolymer (inclusive of solid and, if any, liquid additives, but exclusive of propellant);
   wherein the silica and the graphite are used in a weight ratio in a range of from 1:1.5 to 1:10.

3. The expandable polymer granulate of claim 1, wherein the granulate is obtainable by a process comprising the following steps:
   i) providing continuously to a mass prepolymerization reactor (or the first from a cascade of reactors) a stream of:
      i1) polystyrene homopolymer or copolymer and optionally at least one comonomer comprising p-tert-butyl-styrene,
      i2) at least one additive solution, and
      i3) optionally recycled monomer,
   ii) continuing polymerization in the prepolymerization reactor or the sequence of cascade reactors,
   iii) addition of athermanous fillers: a) silica and b) graphite, and optionally further additives,
   iv) degassing the polymer,
   v) feeding the polymer in molten state into the extruder,
   vi) optionally adding a flame retardant system including synergist and thermal stabilisers,
   vii) injecting blowing agent,
   viii) extruding the homogenous polymer blend, and
   ix) pelletizing in an underwater pelletizer, so as to obtain the granulate,
   wherein
      a) the silica is amorphous and has
         a BET surface of from 1 to 100 m$^2$/g,
         an average particle size in a range of from 3 nm to 1,000 nm, and
      the silica is present in an amount of from 0.01 to less than 2 wt. %, based on the weight of the polymer (inclusive of solid and, if any, liquid additives, but exclusive of propellant), and
      b) the graphite has
         a carbon content in a range of from 50 to 99.99 wt. % and
         a particle size in a range of from 0.01 to 100 µm, and
      the graphite is present in an amount in a range of from 0.01 to 10 wt. %, based on the weight of the polystyrene homopolymer or copolymer (inclusive of solid and, if any, liquid additives, but exclusive of propellant);
   wherein the silica and the graphite are used in a weight ratio in a range of from 1:1.5 to 1:10.

4. The expandable polymer granulate of claim 1, wherein the granulate is obtainable by a process comprising the following steps:

i) providing continuously to a mass prepolymerization reactor (or the first from a cascade of reactors) a stream of:
  i1) polystyrene homopolymer or copolymer and optionally at least one comonomer,
  i2) at least one additive solution, and
  i3) optionally recycled monomer,
ii) continuing polymerization in the prepolymerization reactor or the sequence of cascade reactors,
iii) addition of athermanous fillers: a) silica and b) graphite, and optionally a flame suppressant,
iv) degassing the polymer,
v) feeding the polymer in molten state into the extruder,
vi) optionally adding a flame retardant system including synergist and thermal stabilisers,
vii) injecting blowing agent,
viii) extruding the homogenous polymer blend, and
ix) pelletizing in an underwater pelletizer, so as to obtain the granulate,
wherein
  a) the silica is amorphous and has
    a BET surface of from 1 to 100 $m^2/g$,
    an average particle size in a range of from 3 nm to 1,000 nm, and
  the silica is present in an amount of from 0.01 to less than 2 wt. %, based on the weight of the polymer (inclusive of solid and, if any, liquid additives, but exclusive of propellant), and
  b) the graphite has
    a carbon content in a range of from 50 to 99.99 wt. % and
    a particle size in a range of from 0.01 to 100 μm, and
  the graphite is present in an amount in a range of from 0.01 to 10 wt. %, based on the weight of the polystyrene homopolymer or copolymer (inclusive of solid and, if any, liquid additives, but exclusive of propellant);
  wherein the silica and the graphite are used in a weight ratio in a range of from 1:1.5 to 1:10.

5. The expandable polymer granulate of claim 1, wherein the granulate is obtainable by a process comprising the following steps:
i) providing continuously to a mass prepolymerization reactor (or the first from a cascade of reactors) a stream of:
  i1) polystyrene homopolymer or copolymer and optionally at least one comonomer,
  i2) at least one additive solution, and
  i3) optionally recycled monomer,
ii) continuing polymerization in the prepolymerization reactor or the sequence of cascade reactors,
iii) addition of athermanous fillers: a) silica and b) graphite, and optionally further additives,
iv) degassing the polymer,
v) feeding the polymer in molten state into the extruder directly from the polymerization plant,
vi) optionally adding a flame retardant system including synergist and thermal stabilisers,
vii) injecting blowing agent,
viii) extruding the homogenous polymer blend, and
ix) pelletizing in an underwater pelletizer, so as to obtain the granulate,
wherein
  a) the silica is amorphous and has
    a BET surface of from 1 to 100 $m^2/g$,
    an average particle size in a range of from 3 nm to 1,000 nm, and
  the silica is present in an amount of from 0.01 to less than 2 wt. %, based on the weight of the polymer (inclusive of solid and, if any, liquid additives, but exclusive of propellant), and
  b) the graphite has
    a carbon content in a range of from 50 to 99.99 wt. % and
    a particle size in a range of from 0.01 to 100 μm, and
  the graphite is present in an amount in a range of from 0.01 to 10 wt. %, based on the weight of the polystyrene homopolymer or copolymer (inclusive of solid and, if any, liquid additives, but exclusive of propellant);
  wherein the silica and the graphite are used in a weight ratio in a range of from 1:1.5 to 1:10.

6. The expandable polymer granulate of claim 1, wherein the granulate is obtainable by a process comprising the following steps:
i) providing continuously to a mass prepolymerization reactor (or the first from a cascade of reactors) a stream of:
  i1) polystyrene homopolymer or copolymer and optionally at least one comonomer,
  i2) at least one additive solution, and
  i3) optionally recycled monomer,
ii) continuing polymerization in the prepolymerization reactor or the sequence of cascade reactors,
iii) addition of athermanous fillers: a) silica and b) graphite, and optionally further additives,
iv) degassing the polymer,
v) feeding the polymer in molten state into the extruder,
vi) optionally adding a flame retardant system including synergist and thermal stabilisers,
vii) injecting blowing agent,
viii) extruding the homogenous polymer blend, and
ix) pelletizing in an underwater pelletizer, so as to obtain the granulate,
wherein
  a) the silica is amorphous and has
    a BET surface of from 1 to 100 $m^2/g$,
    an average particle size in a range of from 3 nm to 1,000 nm, and
  the silica is present in an amount of from 0.01 to less than 2 wt. %, based on the weight of the polymer (inclusive of solid and, if any, liquid additives, but exclusive of propellant), and
  b) the graphite has
    a carbon content in a range of from 50 to 99.99 wt. % and
    a particle size in a range of from 0.01 to 100 μm, and
  the graphite is present in an amount in a range of from 0.01 to 10 wt. %, based on the weight of the polystyrene homopolymer or copolymer (inclusive of solid and, if any, liquid additives, but exclusive of propellant);
  wherein the silica and the graphite are used in a weight ratio in a range of from 1:1.5 to 1:10,
  wherein the expandable polymer granulate further comprises one or more additives selected from s) powders of calcium phosphate, mineral with perovskite structure, geopolymer and geopolymer composite, and t) carbon black, petroleum coke, graphitized carbon black, graphite oxides, and graphene.

* * * * *